United States Patent [19]
Barker

[11] Patent Number: 5,896,378
[45] Date of Patent: Apr. 20, 1999

[54] SDH ADD/DROP MULTIPLEXER

[75] Inventor: Andrew James Barker, Attenborough, United Kingdom

[73] Assignee: GPT Limited, Coventry, United Kingdom

[21] Appl. No.: 08/682,499

[22] PCT Filed: Jan. 24, 1995

[86] PCT No.: PCT/GB95/00128

§ 371 Date: Nov. 7, 1996

§ 102(e) Date: Nov. 7, 1996

[87] PCT Pub. No.: WO95/20846

PCT Pub. Date: Aug. 3, 1995

[30] Foreign Application Priority Data

Jan. 26, 1994 [GB] United Kingdom ............... 9401430

[51] Int. Cl.⁶ .................................................... H04J 3/12
[52] U.S. Cl. .................... 370/384; 370/522; 370/535
[58] Field of Search ............................ 370/535, 536, 370/537, 538, 539, 540, 541, 542, 543, 544, 545, 522, 528, 509, 217, 218, 219, 220, 221, 222, 223, 224, 225, 226, 227, 228, 351, 357, 358, 359, 360, 362, 369, 375, 376, 377, 378, 379, 384; 340/825.01, 825.03, 826, 827

[56] References Cited

U.S. PATENT DOCUMENTS

| | | |
|---|---|---|
| 4,964,095 | 10/1990 | Tyrrell et al. . |
| 5,003,531 | 3/1991 | Farinholt et al. . |
| 5,018,135 | 5/1991 | Ashi et al. . |
| 5,263,017 | 11/1993 | Nakajima et al. ............... 370/228 |
| 5,283,785 | 2/1994 | Ferguson ............... 370/535 |
| 5,311,501 | 5/1994 | Takatsu ............... 370/535 |
| 5,636,205 | 6/1997 | Suzuki et al. ............... 370/224 |

FOREIGN PATENT DOCUMENTS

| | | |
|---|---|---|
| 5160789 | 6/1993 | Japan . |
| 2 242 103 | 9/1991 | United Kingdom . |
| 2 253 973 | 9/1992 | United Kingdom . |
| 9002454 | 3/1990 | WIPO . |
| 9300756 | 1/1993 | WIPO . |

OTHER PUBLICATIONS

Ferguson et al., "SDH–Flexibilitaet Auch Im Ortsnetz", Telcom Report, Sep. 1992, pp. 196 & 179.

Glock et al., Synchrone Multiplexeinrichtungen für die untere Netzebene, Apr. 1992, pp. 23–25.

Cointot, "La Famille Synchrofot: Une Gamme D'Equipments Pour Réseaux Synchrones", Jan. 1992, pp. 57–66.

Primary Examiner—Huy D. Vu
Attorney, Agent, or Firm—Spencer & Frank

[57] ABSTRACT

An Add-Drop Multiplexer (ADMUX) for use in a synchronous digital hierarchy telecommunication system is provided with a by-pass whereby, in use, it can be made to interface with a higher bit rate transmission system.

6 Claims, 5 Drawing Sheets

SDH ADD/DROP MULTIPLEXER

BACKGROUND OF THE INVENTION

The present invention relates to telecommunication switching systems and more particularly to switching systems for use in digital transmission systems including so-called synchronous digital hierarchy (SDH) systems.

In such systems digital data is switched by so-called add-drop multiplexers (ADMUX) from a main or core network by a "master" ADMUX into sub-loops each containing a plurality of "slave" ADMUXs each of which is adapted to switch data in the sub-loop into a so-called tributary.

Because of the magnitude/bandwidth requirements of the data flow through the master ADMUX compared with that through the slave ADMUXs the master ADMUX needs to have a greater capacity than the slave ADMUXs. In contrast in order to minimise the manufacturing costs it is preferable for identical standard ADMUXs to be used for both the master ADMUX and the slave ADMUX.

As a result the capacity of all the ADMUXs in the loop is dictated by the relatively high capacity required for the master ADMUX. This means that the slave ADMUXs have a higher capacity than is actually required and as a result the limiting factor on the overall capacity of the loop/ring lies in its interconnections between the ADMUXs. Furthermore, because of the excess capacity when compared with the links between them of the slave ADMUXs there could be circumstances in which the volume/bandwidth data being switched out of the loop by a particular slave ADMUX or ADMUXs is so great that there is no capacity left in the links to enable data to be fed to a slave ADMUX which is downstream of that particular slave ADMUX. It is with this problem that the present invention is concerned.

The present invention is also concerned with adapting an ADMUX so that it can interface with a higher data rate system than that for which it was originally designed.

In the above mentioned synchronous digital hierarchy transmission systems data is transmitted in the form of so-called synchronous transport modules (STM) and these modules are multiplexed at a certain data rate. More particularly in the art reference is made to STM-1 which refers to a synchronous transport module (STM) multiplexing at level 1 which is a signal rate of 155.52 Mbit/s, conforming to ITU (previously CCITT) specification G708. Similarly STM-4 refers to a synchronous transport module multiplexing at level 4 at a signal rate of 622.08 Mbit/s consisting of 4 byte interleaved signals operating at 155.52 Mbit/s and conforming to ITU specification G708. Furthermore STM-16 refers to a synchronous transport module multiplexing at level 16 and having a signal rate of 2488.32 Mbit/s consisting of 16 byte interleaved signals operating at 155.52 Mbit/s and conforming to ITU specification G708.

The present invention is therefore also concerned with adapting an ADMUX which was originally designed for use in an STM-1 system so that it can also be used in an STM-4 system and also for adapting an STM-4 ADMUX which was originally designed for use in an STM-4 system so that it can then be used in an STM-16 system.

JP-A-5160789 discloses an add-drop multiplexer for use in a synchronous digital hierarchy telecommunications system provided with a by-pass, whereby it can be made to interface with a higher bit rate transmission system in that the bit rate on the input signal is higher than the signal applied to the add-drop circuit. The use of ADMUXs in a sub-ring of a telecommunications network is disclosed in Telcom Report, Vol. 15, No. 5 at pages 194–197.

SUMMARY OF THE INVENTION

According to the present invention an Add-Drop Multiplexer (ADMUX) for use in a synchronous digital hierarchy telecommunication transmission system is provided with a by-pass whereby, in use, it can be made to interface with a higher bit rate transmission system and is characterised in that there are means to enable communications data in the SOH of an STM-1 signal which is to by-pass the switch to be transferred to the SOH of an STM-1 signal which is to be switched so that the communications data will be processed by the switch, there being further means to transfer the said communications data back to the SOH of the said by-passed STM-1 as the signals leave the switch.

BRIEF DESCRIPTION OF THE DRAWINGS

How the invention may be carried out will now be described by way of example only and with reference to the accompanying drawings in which.

DESCRIPTION OF THE PREFERRED EMBODIMENT

FIG. 1

Figure 1:
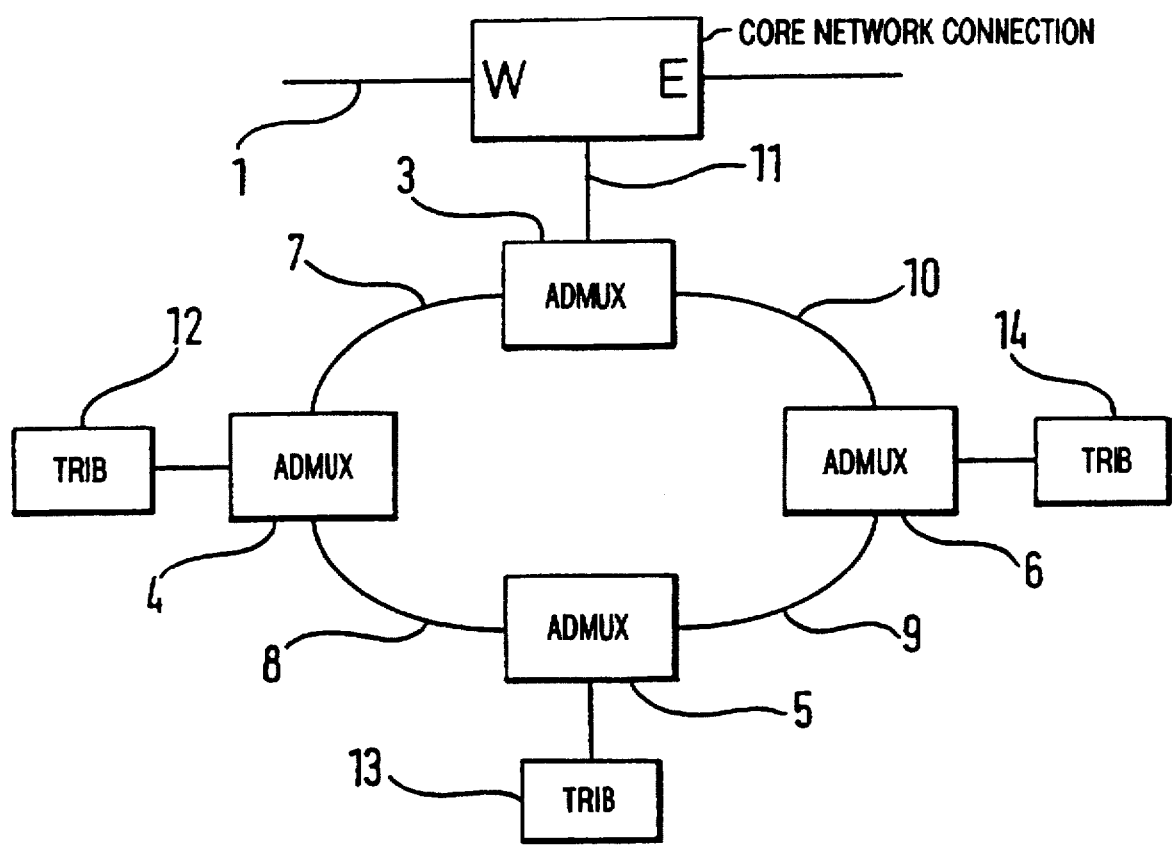
FIG. 1 is a diagrammatic representation of the type of system to which the present invention relates.

The core transmission network is represented at 1 and a typical sub-loop or ring is indicated generally at 2.

The sub-loop 2 consists essentially of four ADMUX switches 3, 4, 5 and 6 respectively interconnected by links 7, 8, 9 and 10, the "master" ADMUX 3 being connected to the core network 1 by a link 11.

Each of the "slave" ADMUXs 4, 5 and 6 serves an associated tributary 12, 13 and 14 respectively.

In order to minimise the manufacturing costs of the system the four ADMUXs 3, 4, 5 and 6 are substantially the same in construction. However, in order to overcome the problem already discussed each of the ADMUXs 4, 5 and 6 is provided with a bypass, which can either be on the ADMUX card or off the card, the effect of the bypass being to enable data to bypass the particular ADMUX.

Thus, for example, the ADMUX 4 is provided with a bypass which will enable data to go straight to the ADMUX 5 and not be switched by the ADMUX 4 into the tributary 12. By this means the capacities of the links 7, 8, 9 and 10 are effectively increased.

In particular the links are upgraded from STM-1 to STM-4 in the case where the ADMUXs 3, 4, 5 and 6 are designed for STM-4.

Figure 2:
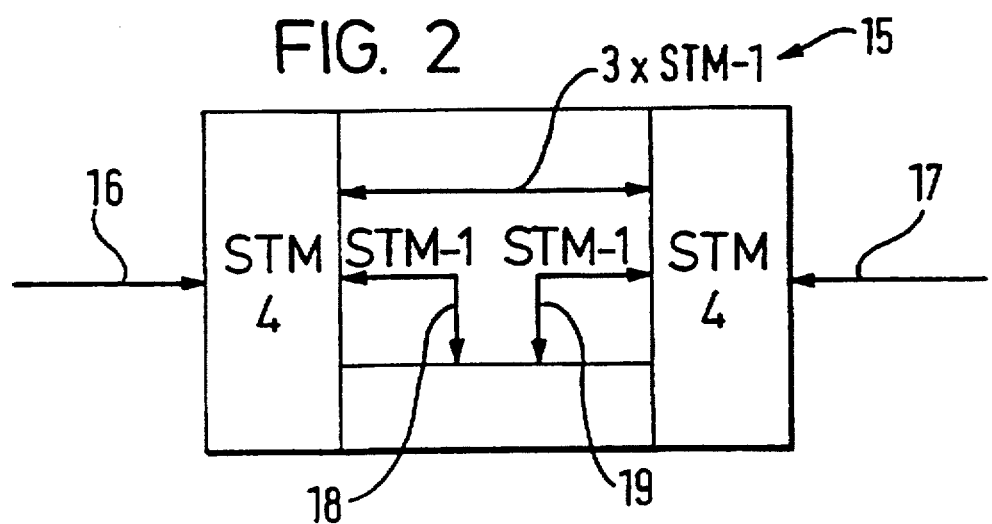
FIG. 2 is a diagrammatic representation of an ADMUX, adapted according to the present invention, and for use in the arrangement shown in FIG. 1.
Figure 3:
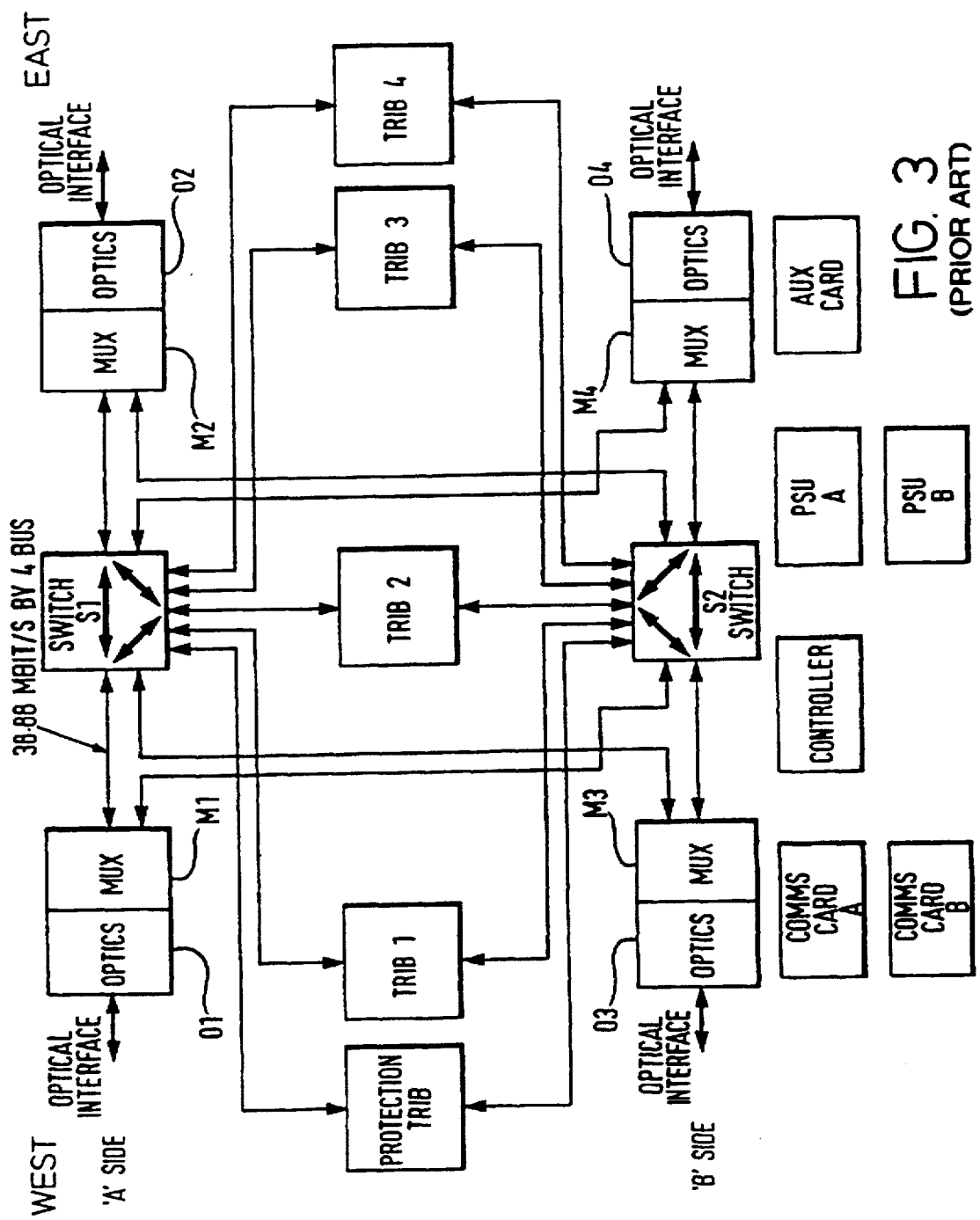
FIG. 3 is a more detailed diagrammatic representation of a prior art ADMUX arrangement.
Figure 4:
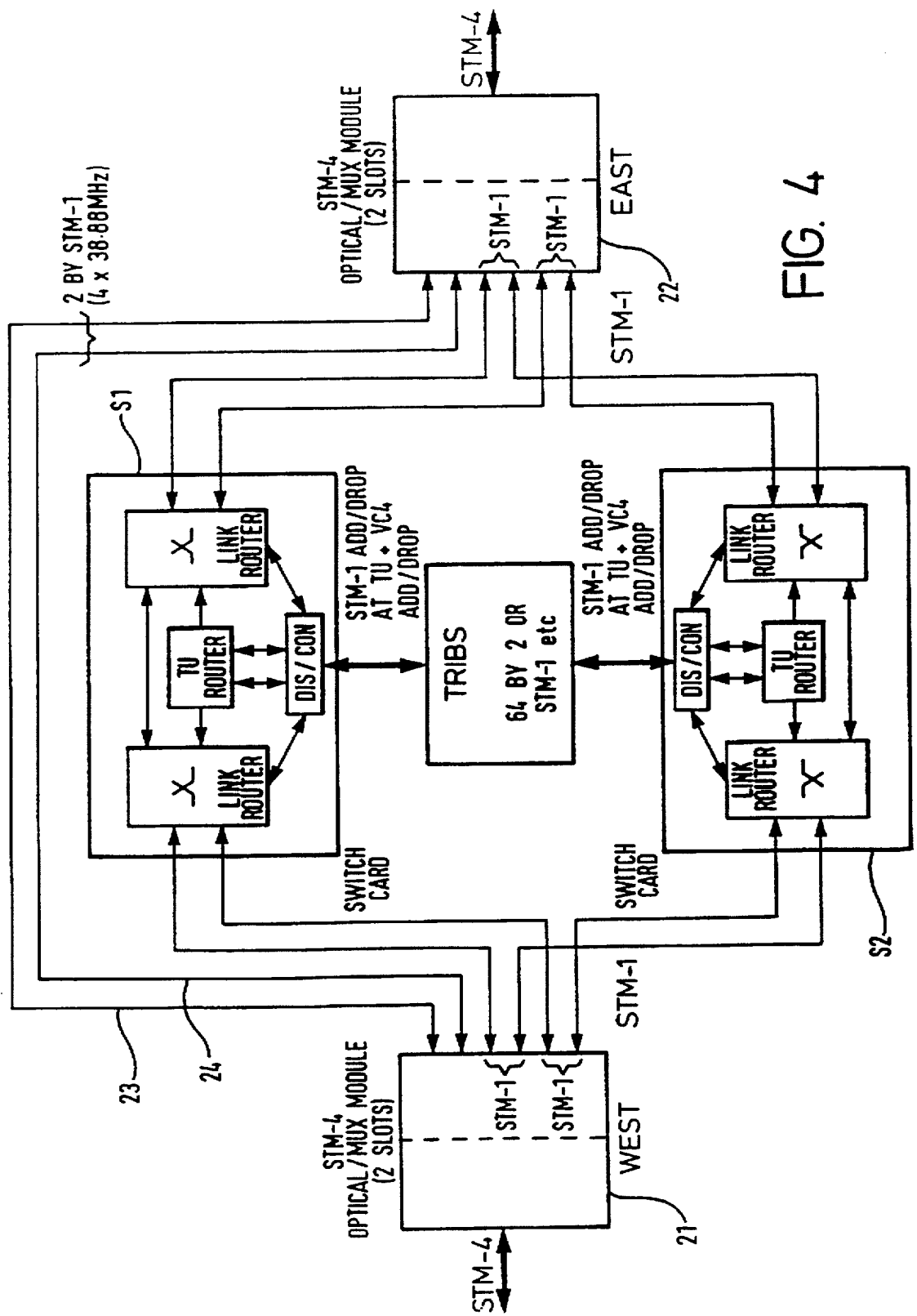
FIG. 4 illustrates an embodiment of the present invention in more detail.
Figure 5:
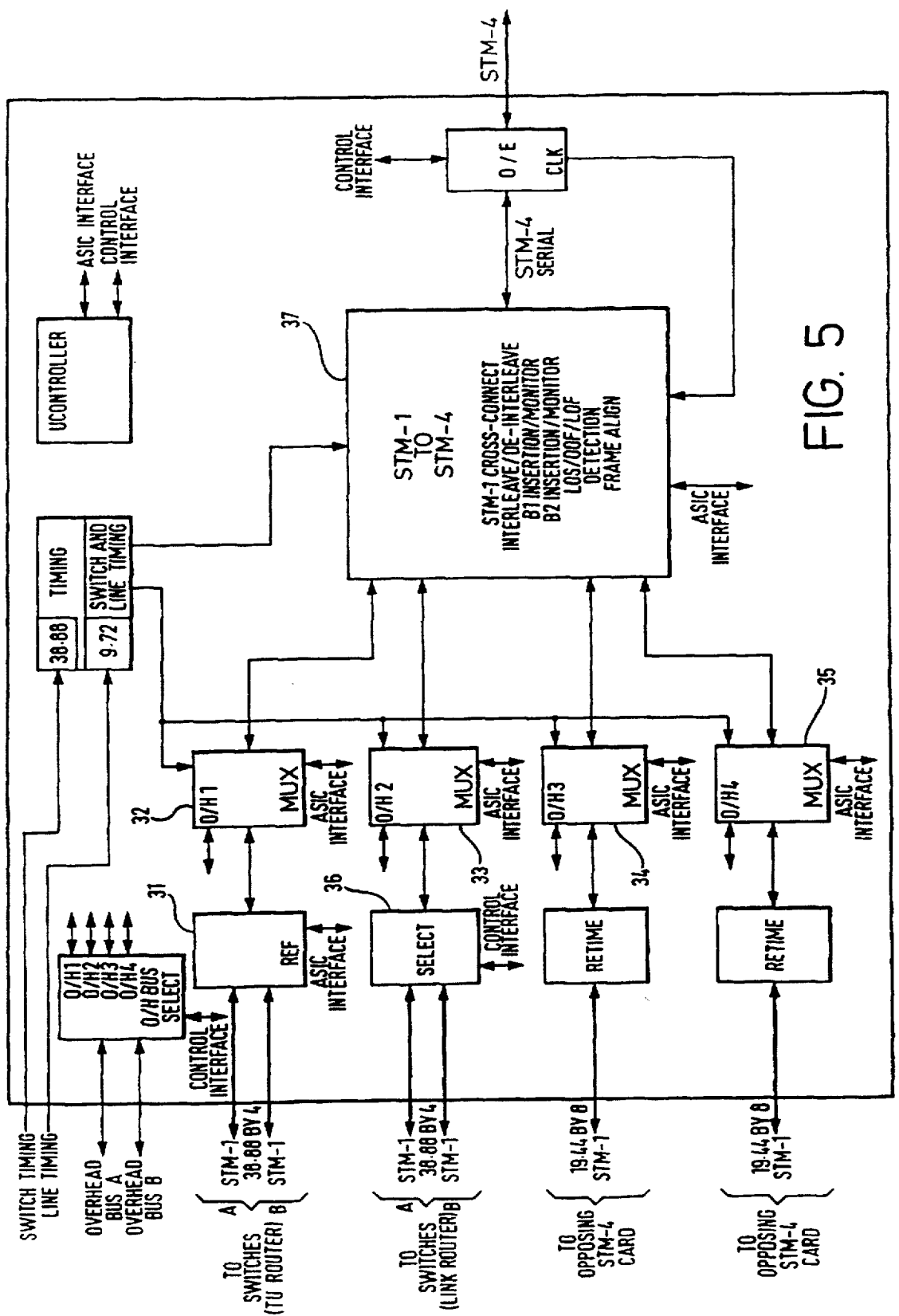
FIG. 5 illustrates the architecture of the arrangement shown in FIG. 4.

FIG. 2 illustrates diagrammatically the ADMUX 5 and shows how with STM-4 entering the switch, one STM-1 is switched down into the tributary 13 whilst the remaining three STM-1's bypass the switch part of the ADMUX. The bypass is indicated at 15, the STM-4 inputs at 16 and 17 and the switched STM-1's at 18 and 19.

The bypass 15 could be incorporated in the relevant ADMUX card or alternatively it could be off the card.

A bypass, according to the present invention, can also be provided in an ADMUX which was originally designed for incorporation in an STM-4 system so that substantially the same construction of ADMUX can be used to interface with an STM-16 system.

The present invention thus enables the basic switch core to be retained, thus reducing design and manufacturing costs, but the switch to be easily adapted so that it can interface with a higher capacity system.

Since the ADMUX switch is capable of switching two by STM-1 (1 at VC12 level and 1 at VC4 level where VC stands for a so-called Virtual Container which carries a signal as per ITU specification G-708 and the numbers "12" and "4" relate to the bandwidth carried) the solution of the invention is to provide a backplane bypass bus for the other two STM-1's. The new STM-4 interface allows selection of which STM-1 goes where. This provides the following routings:

Two by STM-1 west to east line via the bypass bus

One by STM-1 at VC4 level via the switch (either through switching or add/drop at VC4)

One by STM-1 at VC12 level via the switch (either through switching or add/drop)

Thus, the invention allows the addition of a STM-4 capability to the STM-1 ADMUX. It is based on the components of the STM-1 ADMUX and allows the upgrading of an STM-1 ADMUX by the replacement of its STM-1 Optical/Mux line cards and upgraded operational software.

Whilst the invention does not provide a fully functional 2 to 622 Mbit/s ADMUX it does offer the capability to add/drop (selectively) to one of the four STM-1 signals, allowing the provision of switch plane protection and tributary unit (TU) ring protection on that STM-1.

Similarly, as indicated earlier, an STM-4 switch can be upgraded to STM-16 in a similar way. Thus an STM-4 ADMUX for switching eight STM-1 signals can be provided four of these signals being switched at the VC4 level and four at the VC12 level and including a bypass bus capable of carrying eight STM-1 signals.

Thus, an STM 16 line unit is able to be fitted which will select which STM-1 goes via the switch and which by the bypass bus. This allows an upgrade of this product from STM-4 to STM-16 capacity.

FIG. 3

This shows the existing architecture of the STM-1 ADMUX with four STM line cards marked Trib 1, Trib 2, Trib 3 and Trib 4, with a protection tributary card marked Protection Trib, these being connected between two switch cards S1 and S2, which give protected routing through the multiplexer. The card S1 co-operates with the west side of the system and sends signals to an optical interface through an optics card O1 and a corresponding multiplexer M1 and on the east side to an optics card O2 and a corresponding multiplexer M2. Similarly, the switch S2 is connected on the west side to an optics card O3 and multiplexer M3 and on the east side to optics card O4 and multiplexer M4.

FIG. 4

This shows in more detail the arrangement diagrammatically represented in FIG. 2.

There are two STM-4 line units, one west at 21 and one east at 22. Each of these, 21 and 22 split the STM-4 signal into its four constituent STM-1 signals, and can be linked to the opposing STM-4 line unit 22 and 21 respectively by any one of the following methods.

i) One STM-1 via the switch S1, using the normal ADMUX process giving VC12 access. As in the STM-1 ADMUX, both switches can be used, allowing the normal switch plane protection to operate, including TU ring protection and 1:n trib protection in the manner disclosed in our co-pending UK application no. 9400059.3.

ii) One STM-1 via the switch S1, using the normal ADMUX process giving VC4 access only. As in the STM-1 ADMUX, both switches can be used, allowing the normal switch plane protection to operate, including TU ring protection and 1:n trib protection.

iii) Two STM-1 signals travel via bypass busses 23, and 24 directly to the opposing STM-4 unit i.e. 22 or 21 respectively. No access is provided to these signals for Add-Drop. These busses would be 4 bit by 38.88 MHz busses. The choice of signal to use the switch path is made on the STM-4 card.

FIG. 5

This shows the architecture of a STM-4 Optical/Mux unit. On the internal interface side, one switch card incoming STM-1 signal (configured as 38.88 Mhz by 4) feed into a rejustifier ASIC 31 the other to ASIC 36. The remaining two STM-1 signals which feed into ASICS 34 and 35 from the opposing STM-4 card do not use a rejustifier. The signals then feed into a new STM-1/STM-4 circuit 37, to be byte interleaved into an STM-4 signal. This circuitry also performs BIP calculation and scrambling. It would preferably consist of an ASIC to handle the lower speed processing, with the high speed interleaving being performed by other devices. The electrical STM-4 signal then undergoes electrical/optical conversion before transmission to line.

The incoming STM-4 signal uses the reverse to that described above. The STM-4 processing function also allows switching of the STM-1 outputs in order to allow selection of the STM-1's to be add-dropped.

Physically the STM-4 Optical/Mux unit will occupy two card slots, those previously used by two STM-1 line cards. The likely split would be one card to handle the main multiplexing and the second the interleaving and optical/electrical conversion. This may be one unit or two cards with ribbon cable type linking.

Figure 6:
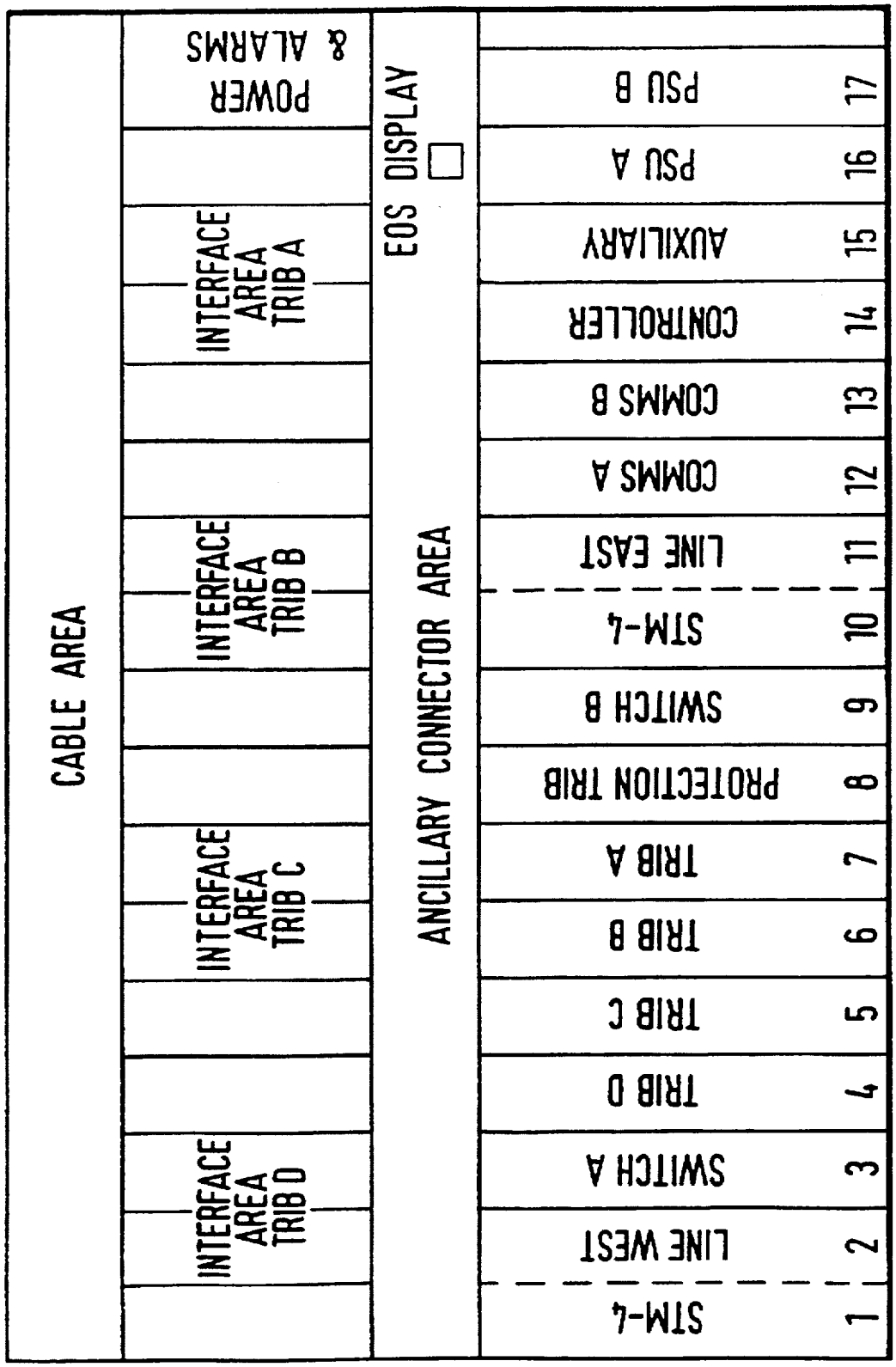
FIG. 6 illustrates an example of a suitable sub-rack layout.

An example of a suitable sub-rack layout is shown in FIG. 6.

In the above described arrangements each of the signals of the STM-4 and STM-16 carry a so-called Section Overhead (SOH), as defined in ITU specification G708. In other words in the case of STM-4 there will be four signals each having a SOH and in the case of STM-16 there will be sixteen signals each having a SOH.

A problem can arise, in applying the present invention, where a particular SOH is used for communications and this particular SOH would otherwise be one of the SOH's which by-passes the switch. In that situation there would be no access to it and therefore no communication.

In that case the present invention could provide means whereby the SOH of that particular signal, say the STM-1 #1 signal, is swapped or transformed for the SOH of another of the associated STM-1's which is to be processed by the switch before splitting the signals between the by-pass bus and the switch.

By this means the communication data will be processed by the switch. The reverse "swapping" or transfer is done as the signals leave the switch and by-pass in order to restore the correct SOH to the particular STM-1, e.g. STM-1 #1.

What is claimed is:

1. An Add-Drop Multiplexer (ADMUX) for use in a digital communications system is provided with a by-pass to enable its data switch capacity to match the transmission capacity of a sub-ring in which it may in use be connected, the ADMUX having means to enable communications data in the SOH of an STM-1 signal which is to by-pass a switch of the ADMUX to be transferred to the SOH of an STM-1 signal which is to be switched so that the communications data will be processed by the switch, there being further means to transfer the communications data back to the SOH of the by-passed STM-1 as the signals leave the switch.

2. An Add-Drop Multiplexer (ADMUX) for use in a synchronous digital hierarchy telecommunications system is provided with a by-pass whereby, in use, it can be made to interface with a higher bit rate transmission system, they by-pass being incorporated on a circuit card of the ADMUX, the ADMUX having means to enable communications data in the SOH of an STM-1 signal which is to by-pass a switch of the ADMUX to be transferred to the SOH of an STM-1 signal which is to be switched so that the communications data will be processed by the switch, there being further means to transfer the communications data back to the SOH of the by-passed STM-1 as the signals leave the switch.

3. An add-Drop Multiplexer (ADMUX) for use in a synchronous digital hierarchy telecommunications system is provided with a by-pass whereby, in use, it can be made to interface with a higher bit rate transmission system, the by-pass being formed outside the card or cards forming the ADMUX, the ADMUX having means to enable communications data in the SOH of an STM-1 signal which is to by-pass a switch of the ADMUX to be transferred to the SOH of an STM-1 signal which is to be switched so that the communications data will be processed by the switch, there being further means to transfer the communications data back to the SOH of the by-passed STM-1 as the signals leave the switch.

4. A synchronous digital hierarchy telecommunications system comprising at least one ADMUX, said ADMUX having means to enable communications data in the SOH of an STM-1 signal which is to by-pass a switch of the ADMUX to be transferred to the SOH of an STM-1 signal which is to be switched so that the communications data will be processed by the switch, there being further means to transfer the communications data back to the SOH of the by-passed STM-1 as the signals leave the switch.

5. A digital telecommunications system comprising at least one ADMUX, said ADMUX having means to enable communications data in the SOH of an STM-1 signal which is to by-pass a switch of the ADMUX to be transferred to the SOH of an STM-1 signal which is to be switched so that the communications data will be processed by the switch, there being further means to transfer the communications data back to the SOH of the by-passed STM-1 as the signals leave the switch.

6. An Add-Drop Multiplexer (ADMUX) for use in a synchronous digital hierarchy telecommunications system is provided with a by-pass whereby, in use, it can be made to interface with a higher bit rate transmission system, the ADMUX having means to enable communications data in the SOH of an STM-1 signal which is to by-pass a switch of the ADMUX to be transferred to the SOH of an STM-1 signal which is to be switched so that the communications data will be processed by the switch, there being further means to transfer the said communications data back to the SOH of the by-passed STM-1 as the signals leave the switch.

* * * * *